United States Patent
Ilani et al.

(10) Patent No.: US 11,468,797 B2
(45) Date of Patent: Oct. 11, 2022

(54) LOW COMPLEXITY CONVERSION TO MONTGOMERY DOMAIN

(71) Applicant: Western Digital Technologies, Inc., San Jose, CA (US)

(72) Inventors: Ishai Ilani, Dolev (IL); Noam Weber, Moshav Salit (IL)

(73) Assignee: Western Digital Technologies, Inc., San Jose, CA (US)

( * ) Notice: Subject to any disclaimer, the term of this patent is extended or adjusted under 35 U.S.C. 154(b) by 282 days.

(21) Appl. No.: 16/911,342

(22) Filed: Jun. 24, 2020

(65) Prior Publication Data

US 2021/0407322 A1   Dec. 30, 2021

(51) Int. Cl.
*G06F 7/72*   (2006.01)
*G09C 1/00*   (2006.01)
*G06F 7/523*   (2006.01)

(52) U.S. Cl.
CPC .............. *G09C 1/00* (2013.01); *G06F 7/523* (2013.01); *G06F 7/721* (2013.01); *G06F 7/722* (2013.01); *G06F 7/724* (2013.01); *G06F 7/728* (2013.01)

(58) Field of Classification Search
CPC . G09C 1/00; G06F 7/523; G06F 7/728; G06F 7/72; G06F 7/38; G06F 7/724; G06F 7/723; G06F 9/3001; G06F 7/722; G06F 7/52; G06F 7/721; G06F 21/72; G06F 7/535; G06F 7/5324; G06F 17/10; G06F 21/52; G06F 7/729; G06F 7/726; G06F 12/14; G06F 7/725; G06F 9/30014; H04L 9/0841; H04L 9/302; H04L 2209/122; H04L 9/3066; H04L 9/14; H04L 9/003
See application file for complete search history.

(56) References Cited

U.S. PATENT DOCUMENTS 5,513,133 A   4/1996   Cressel et al.
6,182,104 B1   1/2001   Foster et al.
(Continued)

FOREIGN PATENT DOCUMENTS

WO   WO 2000/42484 A2   7/2000
WO   WO 2005/048008 A2   5/2005

OTHER PUBLICATIONS

Analyzing and Comparing Montgomery Multiplication Algorithms. Cetin Kaya Koc et al. (Year: 1996).*
(Continued)

*Primary Examiner* — Vibol Tan
(74) *Attorney, Agent, or Firm* — Patent Law Works LLP

(57) ABSTRACT

Disclosed herein is an apparatus for calculating a cryptographic component $R^2$ mod n for a cryptographic function, where n is a modulo number and R is a constant greater than n. The apparatus comprises an arithmetic logic unit configured to iteratively perform Montgomery multiplication of a first operand with a second operand to produce an intermediate result, wherein the first operand and the second operand are set to the intermediate result after each iteration, responsive to a termination condition being met, determine an adjustment parameter indicative of a difference between the intermediate result and the cryptographic component, and perform Montgomery multiplication of the intermediate result with the adjustment parameter, to calculate the cryptographic component for the cryptographic function.

20 Claims, 8 Drawing Sheets

(56) References Cited

U.S. PATENT DOCUMENTS

| | | | |
|---|---|---|---|
| 6,185,596 B1 | 2/2001 | Hadad et al. | |
| 6,668,267 B1 | 12/2003 | Pomet | |
| 6,914,983 B2 * | 7/2005 | Chen | G06F 7/722 708/530 |
| 7,050,579 B1 * | 5/2006 | Koc | G06F 7/721 708/135 |
| 7,111,166 B2 | 9/2006 | Dror et al. | |
| 8,024,391 B2 * | 9/2011 | Douguet | G06F 7/722 708/492 |
| 8,265,266 B2 | 9/2012 | Ciet et al. | |
| 8,527,570 B1 * | 9/2013 | Shu | G06F 7/728 708/491 |
| 8,532,286 B2 * | 9/2013 | Lambert | H04L 9/30 380/28 |
| 9,152,383 B2 | 10/2015 | Bertoni et al. | |
| 10,361,854 B2 * | 7/2019 | Guilley | H04L 9/302 |
| 11,296,865 B1 * | 4/2022 | Griffin | H04L 9/006 |
| 2004/0167952 A1 | 8/2004 | Gueron et al. | |
| 2010/0177887 A1 | 7/2010 | Ciet et al. | |
| 2021/0407323 A1 * | 12/2021 | Ilani | G06F 7/722 |

OTHER PUBLICATIONS

Long Modular Multiplication for Cryptographic Applications. Laszlo Hars (date unknown).*
Montgomery Multiplication. Koc (date unknown).*
Montgomery Multiplier for Faster Cryptosystems. Nitha Thampi et al. (Year: 2016).*
Bertoni, G. et al, "Montgomery Multiplication", Foundations of Cryptography—Montgomery Multiplication.
Walter, C. D., "Hardware Aspects of Montgomery Modula Multiplication", IACR Cryptol. ePrint Arch. 2017: 1115 (2017).

* cited by examiner

| 2048 bit key | Total clock cycles | Clock frequency (MHz) | Clock period (nsec) | Latency (usec) |
|---|---|---|---|---|
| Direct modulo reduction | 151,552 | 200 | 5 | 757.76 |
| Improved method | 52,728 | 200 | 5 | 263.64 |
| Saving | 98,824 | 200 | 5 | 494.12 |

Fig. 5A

| 3072 bit key | Total clock cycles | Clock frequency (MHz) | Clock period (nsec) | Latency (usec) |
|---|---|---|---|---|
| Direct modulo reduction | 325,632 | 200 | 5 | 1628.16 |
| Improved method | 125,536 | 200 | 5 | 627.68 |
| Saving | 200,096 | 200 | 5 | 1000.48 |

Fig. 5B

| 4096 bit key | Total clock cycles | Clock frequency (MHz) | Clock period (nsec) | Latency (usec) |
|---|---|---|---|---|
| Direct modulo reduction | 565,248 | 200 | 5 | 2826.24 |
| Improved method | 220,584 | 200 | 5 | 1102.92 |
| Saving | 344,664 | 200 | 5 | 1723.32 |

Fig. 5C $b = 16$

| Key size (bits) | Total clock cycles | Clock frequency (MHz) | Clock period (nsec) | Latency (usec) |
|---|---|---|---|---|
| 2048 | 36,754 | 200 | 5 | 183.77 |
| 3072 | 89,304 | 200 | 5 | 446.52 |
| 4096 | 155,904 | 200 | 5 | 779.52 |

Fig. 8A $b = 1024$

| Key size (bits) | Total clock cycles | Clock frequency (MHz) | Clock period (nsec) | Latency (usec) |
|---|---|---|---|---|
| 2048 | 107,257 | 200 | 5 | 536.29 |
| 3072 | 176,652 | 200 | 5 | 883.26 |
| 4096 | 247,812 | 200 | 5 | 1239.06 |

Fig. 8B

LOW COMPLEXITY CONVERSION TO MONTGOMERY DOMAIN

TECHNICAL FIELD

The present technology relates to the field of conversion of operands to the Montgomery domain, and in particular, to the efficient calculation of the component $R^2$ mod n as used in the conversion of operands to the Montgomery domain.

BACKGROUND

Many public key cryptographic algorithms utilise modular arithmetic, in particular modulo multiplication. For example, the cryptographic systems of Rivest-Shamir-Adleman (RSA) and Diffie-Hellman key exchange use arithmetic operations modulo a large number. RSA calculates an exponential modulo n, where n is a product of two prime numbers.

Given two integers a and b and modulus n, some modular multiplication algorithms compute the double-width product ab and then perform a division by subtracting multiples of n to cancel out the unwanted high bits until the remainder is once again less than n. This technique is referred to as direct modulo reduction.

Undesirably, direct modulo reduction can be a lengthy calculation due to the width of product ab and the number of subtractions performed to determine a remainder less than the modulus. Similarly, solutions which perform division, rather than iterative subtraction, can be computationally expensive due to the quotient estimation.

Montgomery Multiplication

Montgomery modular multiplication, hereafter Montgomery multiplication, is a method for performing faster modular multiplication. Montgomery multiplication provides for a method of multiplying two operands modulo n, while avoiding division by n. Instead of subtracting multiples of n, Montgomery multiplication adds multiples of n to cancel out the low bits until the result is a multiple of a constant $R=2^l$ for some integer l, and R is greater than n. The low bits are then discarded, producing a result less than 2n. If the result is greater than n, then subtracting n one more time reduces the result to less than n.

In many situations, Montgomery multiplication reduces computational complexity, compared to other division algorithms, because it avoids the quotient digit estimation and correction. However, to perform Montgomery multiplication on two operands, each operand is converted to a Montgomery domain representation, which is an alternative mathematical representation of the operand. Conversion to the Montgomery domain comprises a calculation which utilises a conversion component $R^2$ mod n.

The calculation of the conversion component $R^2$ mod n can be computationally expensive and represent a substantial overhead incurred during conversion of a product to the Montgomery domain. Accordingly, there is a need to improve the efficiency of calculating $R^2$ mod n.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

The present technology seeks to provide improved method and apparatus for the calculation of the component $R^2$ mod n, through the application of iterative Montgomery multiplication calculations, followed by an adjustment of the Montgomery multiplication product to produce the result, $R^2$ mod n.

Disclosed herein is a method for calculating a cryptographic component $R^2$ mod n for a cryptographic function, where n is a modulo number, and R is a constant greater than n. The method comprises iteratively performing Montgomery multiplication of a first operand with a second operand to produce an intermediate result, wherein the first operand and the second operand are set to the intermediate result after each iteration, responsive to a termination condition being met, determining an adjustment parameter indicative of a difference between the intermediate result and the cryptographic component, and performing Montgomery multiplication of the intermediate result with the adjustment parameter, to calculate the cryptographic component for the cryptographic function.

In some embodiments, the cryptographic component is an integer equal to $R^2$ mod n, wherein R is of the form $2^l$, l is an integer, n is an integer which is less than R, and R is coprime with n. In some embodiments, the intermediate result, when the termination condition is met, is greater than the cryptographic component.

In some embodiments, determining the adjustment parameter comprises determining an excess parameter, the excess parameter being indicative of a difference between the intermediate result and the cryptographic component.

In some embodiments, the adjustment parameter is a function of an inverse of the excess parameter. In some embodiments, the termination condition is met when the intermediate result is in the form yR mod n, wherein y is greater than R. In some embodiments, the apparatus further comprises determining a base value. In some embodiments, the base value is equal to 2R mod n. In some embodiments, the termination condition is the completion of k Montgomery multiplication iterations, where k is a first integer for which $2^{2^k}$ is greater than or equal to R.

In some embodiments, the determining the excess parameter comprises determining an integer c for which $2^{2^{k}-c}$ is equal to R, and setting the excess parameter to be equal to $2^c$. In some embodiments, the adjustment parameter is equal to the inverse of the excess parameter multiplied by R mod n. In some embodiments, the base value is equal to $2^b R$, wherein b is an integer greater than or equal to 1, b is less than $(2^k-1)$, and k is a first integer for which $2^{2^k}$ is greater than or equal to R.

In some embodiments, the termination condition is the completion of i Montgomery multiplication iterations, where i is a first integer for which $2^{2^{i}b}$ is greater than or equal to R. In some embodiments, the determining the excess parameter comprises determining an integer c for which $2^{2^{i}b-c}$ is equal to R, and setting the excess parameter to be equal to $2^c$. In some embodiments, the adjustment parameter is equal to the inverse of the excess parameter multiplied by R.

In some embodiments, the method further comprises determining an integer b, where b is greater than or equal to 1, and b is less than $(2^k-1)$, responsive to b being equal to 1, setting the base value to an integer equal to 2R mod n, and responsive to b being greater than 1, setting the base value to an integer equal to $2^b R$.

In some embodiments, the method further comprises responsive to b being equal to 1, setting the termination condition to be the completion, by the arithmetic logic unit, of k Montgomery multiplication iterations, where k is a first integer for which $2^{2^k}$ is greater than or equal to R, and responsive to b being greater than 1, setting the termination condition to be the completion of i Montgomery multiplication iterations, where i is a first integer for which $2^{2^i b}$ is greater than or equal to R.

Disclosed herein is an apparatus for calculating a cryptographic component $R^2$ mod n for a cryptographic function, where n is a modulo number, and R is a constant greater than n. The apparatus comprises an arithmetic logic unit configured to iteratively perform Montgomery multiplication of a first operand with a second operand to produce an intermediate result, wherein the first operand and the second operand are set to the intermediate result after each iteration, responsive to a termination condition being met, determine an adjustment parameter indicative of a difference between the intermediate result and the cryptographic component, and perform Montgomery multiplication of the intermediate result with the adjustment parameter, to calculate the cryptographic component for the cryptographic function.

In some embodiments, the arithmetic logic unit comprises a Montgomery multiplication unit having a first and a second input for receiving a first and a second operand, respectively, and having an output for supplying an intermediate result, the Montgomery multiplication unit configured to perform a Montgomery multiplication function on the first and the second operands to produce the intermediate result, and a controller for controlling the values of the first input and the second input, the controller configured to perform the steps of, iteratively setting the first and the second input to the intermediate multiplication result, until a termination condition is met, responsive to the termination condition being met, setting the first input to the intermediate result and setting the second input to an adjustment parameter.

Disclosed herein is an apparatus for calculating a cryptographic component $R^2$ mod n for a cryptographic function, where n is a modulo number, and R is a constant greater than n, the apparatus comprising, means for iteratively performing Montgomery multiplication of a first operand with a second operand to produce an intermediate result, wherein the first operand and the second operand are set to the intermediate result after each iteration, means for, responsive to a termination condition being met, determining an adjustment parameter indicative of a difference between the intermediate result and the cryptographic component, and means for performing Montgomery multiplication of the intermediate result with the adjustment parameter, to calculate the cryptographic component for the cryptographic function.

BRIEF DESCRIPTION OF DRAWINGS

The technology will be described with reference to the following drawings, in which:

FIGS. 5A-5C are tables comprising performance figures for calculating $R^2$ mod n according to an embodiment;

FIGS. 8A-8B are tables comprising performance figures for calculating $R^2$ mod n according to an embodiment.

DESCRIPTION OF EMBODIMENTS

Cryptographic Processing Unit

Figure 1:
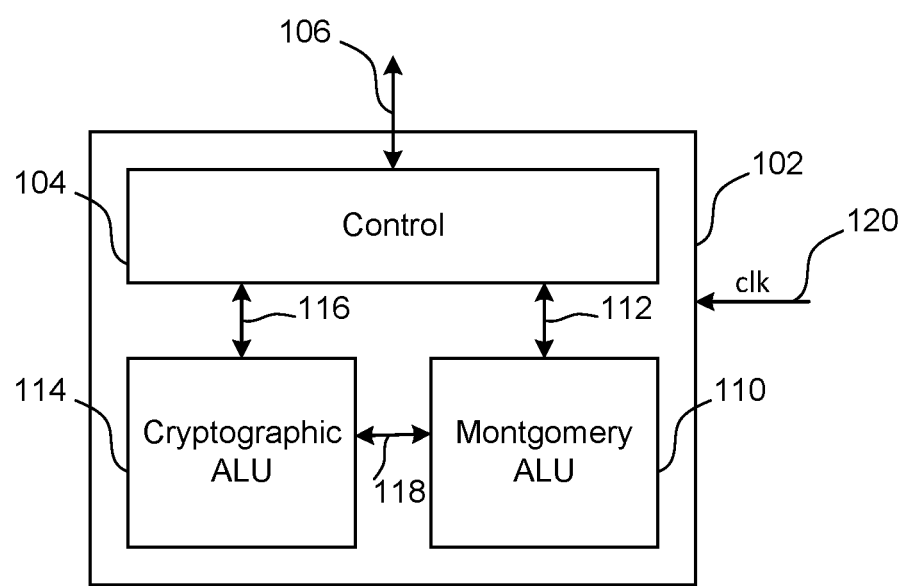
FIG. 1 is a block diagram illustrating a cryptographic processing unit, according to an embodiment.

FIG. 1 is a block diagram illustrating a cryptographic processing unit 102 which is configured to perform cryptographic processing in accordance with one or more cryptographic algorithms, according to an embodiment. The processing unit 102 may be a logic unit of an application specific integrated circuit (ASIC), field programmable gate array (FPGA) or other form of logic device. The cryptographic processing unit 102 may be integrated within a larger arithmetic logic unit or other processing unit.

The cryptographic processing unit 102 comprises a control logic unit 104, which receives control and data input via signal 106. The control logic unit 104 outputs resulting data from cryptographic processing via data signal 106. The cryptographic processing unit 102 further comprises a Montgomery arithmetic logic unit (ALU) 110, which is configured to convert to and from the Montgomery domain, and to process within the Montgomery domain. The cryptographic processing unit 102 also comprises a cryptographic ALU 114, which is configured to provide cryptographic processing outside the Montgomery domain. The modules of the cryptographic processing unit 102 are clocked by clock signal 120.

Calculating $s^e$ Mod n

In one embodiment, the cryptographic processor 102 is configured to perform cryptographic functions in accordance with the Rivest-Shamir-Adleman (RSA) cryptographic algorithm. The cryptographic processor 102 performs modular exponentiation, as part of the RSA algorithm, to compute $z=s^e$ mod n, where n is a large number which may be greater than 2020 bits long in a binary representation.

To calculate $z=s^e$ mod n, the cryptographic processor 102 converts the operand s to a corresponding Montgomery domain representation, which is an alternative mathematical representation of the operand s. The cryptographic processor 102 then calculates the Montgomery domain representation of z within the Montgomery domain. The cryptographic processor 102 may then convert the Montgomery domain representation of z to the integer domain, to produce the desired result z.

Converting to the Montgomery Domain

Converting to and from the Montgomery domain is an additional step not performed in other modulo multiplication algorithms; however, when performing many multiplications in a row, as in modular exponentiation, intermediate results can be left in the Montgomery domain representation, and the initial and final conversions may become a negligible fraction of the overall computation.

In one embodiment, the cryptographic processor 102 converts the operand s to the Montgomery domain by computing s′=sR mod n, for some R=$2^l$>n, where l is greater than or equal to the number of bits of n. The cryptographic processor 102 calculates the value sR mod n by performing modulo multiplication of the operand (s=s mod n) with the conversion component ($R^2$ mod n). The cryptographic processor then applies a Montgomery reduction function REDC ((s mod n)($R^2$ mod n)) to reduce the modulo multiplication product by a factor of R, to produce the result sR mod n.

Montgomery Multiplication

The combined operation of the modulo multiplication of two Montgomery domain operands, modulo n, and the subsequent application of the Montgomery reduction function to the resulting product of the modulo multiplication is called Montgomery multiplication.

Montgomery multiplication is a function that can be performed by the Montgomery ALU 110 in a number of circumstances. For example, in one embodiment, the cryptographic processor 102 configures the Montgomery ALU 110 to perform the Montgomery multiplication function on two Montgomery domain operands aR mod n and bR mod n, as defined by the cryptographic processor control 104. In performing Montgomery multiplication, the Montgomery ALU 110 multiplies the Montgomery domain operands aR mod n and bR mod n within the Montgomery domain to produce product ab$R^2$ mod n. The Montgomery ALU 110 then applies the Montgomery reduction function to produce abR mod n, which is the Montgomery domain form of the desired product of operands a and b modulo n.

For some cryptographic algorithms, the Montgomery ALU 110 then converts the Montgomery domain form of the product out of the Montgomery domain, by performing a second Montgomery reduction function. Alternatively, if the cryptographic algorithm performed by the cryptographic processor 102 specifies further modulo multiplication involving the product, the cryptographic processor 102 may keep the Montgomery domain form of the product for use as an operand of further Montgomery multiplication functions.

Conversion Component

In order to convert an operand to its corresponding Montgomery domain representation, the cryptographic processor 102 calculates the conversion component $R^2$ mod n. The calculation of $R^2$ mod n involves the determination of an integer value equal to $R^2$ mod n. Such an integer is referred to as the "cryptographic component", "conversion component" or simply "component" throughout this disclosure.

Calculation of the Component Via Direct Modulo Reduction

Processor 102 can calculate $R^2$ mod n by performing direct modulo reduction, e.g. by applying a Euclidean algorithm. When $R^2$ is significantly larger than n, direct modulo reduction may take many iterations.

For small exponents, e, such as the exponents typically used for signature verification algorithms, the direct reduction of $R^2$ mod n may take over half the time of the computation of $s^e$ mod n. Accordingly, the direct modulo reduction of $R^2$ mod n can be quite computationally expensive.

Embodiments of the present disclosure seek to ameliorate the issue of expensive calculation of the component $R^2$ mod n by reducing the clock cycles consumed for the calculation of the component $R^2$ mod n, compared to calculating $R^2$ mod n via direct modulo reduction.

Accordingly, embodiments of the present disclosure provide a method and apparatus for calculation of the component $R^2$ mod n, through application of iterative Montgomery multiplication calculations, followed by an adjustment of the Montgomery multiplication product.

Montgomery ALU Subsection

Figure 2:
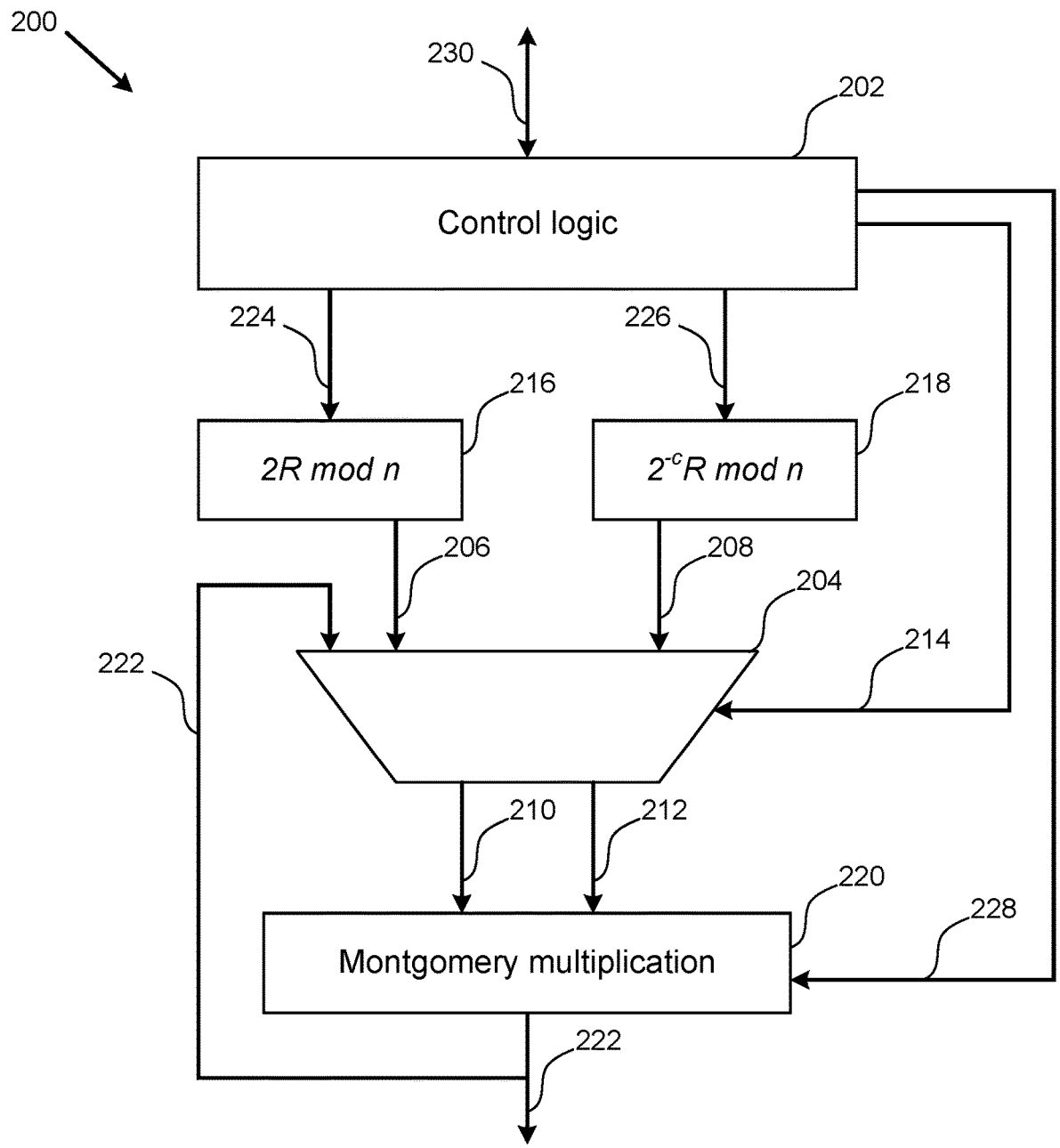
FIG. 2 is a block diagram illustrating a subsection of a Montgomery arithmetic logic unit (ALU) of FIG. 1, according to an embodiment.

FIG. 2 is a block diagram illustrating a subsection 200 of the Montgomery ALU 110. Subsection 200 can be used by the Montgomery ALU 110 to calculate the component ($R^2$ mod n), in accordance with an embodiment.

Control logic block 202 provides control signals 214, 228 to control the function of other blocks within the subsection 200. Control logic block 202 also provides data values, via signals 224 and 226, to be stored in Register A 216 and Register B 218, respectively.

Multiplexer 204 is a 3:2 multiplexer which maps three input signals 206, 208, 222 to two output signals 210, 212 in accordance with the value of the selection signal 214. The selection signal 214 is set by the control logic block 202 and indicates the mapping of one of the three input signals 206, 208, 222 to output signal 210. The selection signal 214 also indicates the mapping of one of the three input signals 206, 208, 222 to output signal 212. Input signal 206 is set by Register A 216. Input signal 208 is set by Register B 218.

Montgomery multiplication block 220 operates to perform Montgomery multiplication on a first and a second operand. The first operand is provided, via multiplexer 204, on data signal 210, and the second operand is provided, via multiplexer 204, on data signal 212. Functional block 220 outputs the result of Montgomery multiplication of the first operand and the second operand on output signal 222. Control logic block 202, multiplexer 204 and Montgomery multiplication unit 220 are all clocked by clock signal 120.

The Montgomery ALU 110 provides control signals and parameters to the control logic block 202 of the subsection 200, via signal 230. Parameters can comprise the values of R and n. The Montgomery ALU 110 provides the component $R^2$ mod n, as output from the Montgomery multiplication on data signal 222, to logic units within the cryptographic processing unit 102. The component $R^2$ mod n may then be used in cryptographic functions performed by the cryptographic processing unit 102.

First Embodiment—Base of 2R mod n

In a first embodiment, the cryptographic component ($R^2$ mod n) is calculated by determining an exponent $2^k$ which raises 2 to a value greater than R, such that $2^{2^k}$≥R. Then, the Montgomery ALU 110 iteratively performs Montgomery multiplication of two identical operands, from a base of 2R mod n, iteratively producing an intermediate multiplication result. The intermediate multiplication result becomes both the first and the second operands for the next Montgomery multiplication, until the intermediate multiplication result is greater than the component $R^2$ mod n.

The Montgomery ALU 110 then determines how much greater the intermediate multiplication result is compared to the component $R^2$ mod n, based on the value of k, and defines an excess parameter based thereon. Then, the Montgomery ALU performs a Montgomery multiplication of the intermediate multiplication result and an adjustment parameter, where the adjustment parameter is a function of the inverse of the excess parameter, to produce the component $R^2$ mod n.

Figure 3:
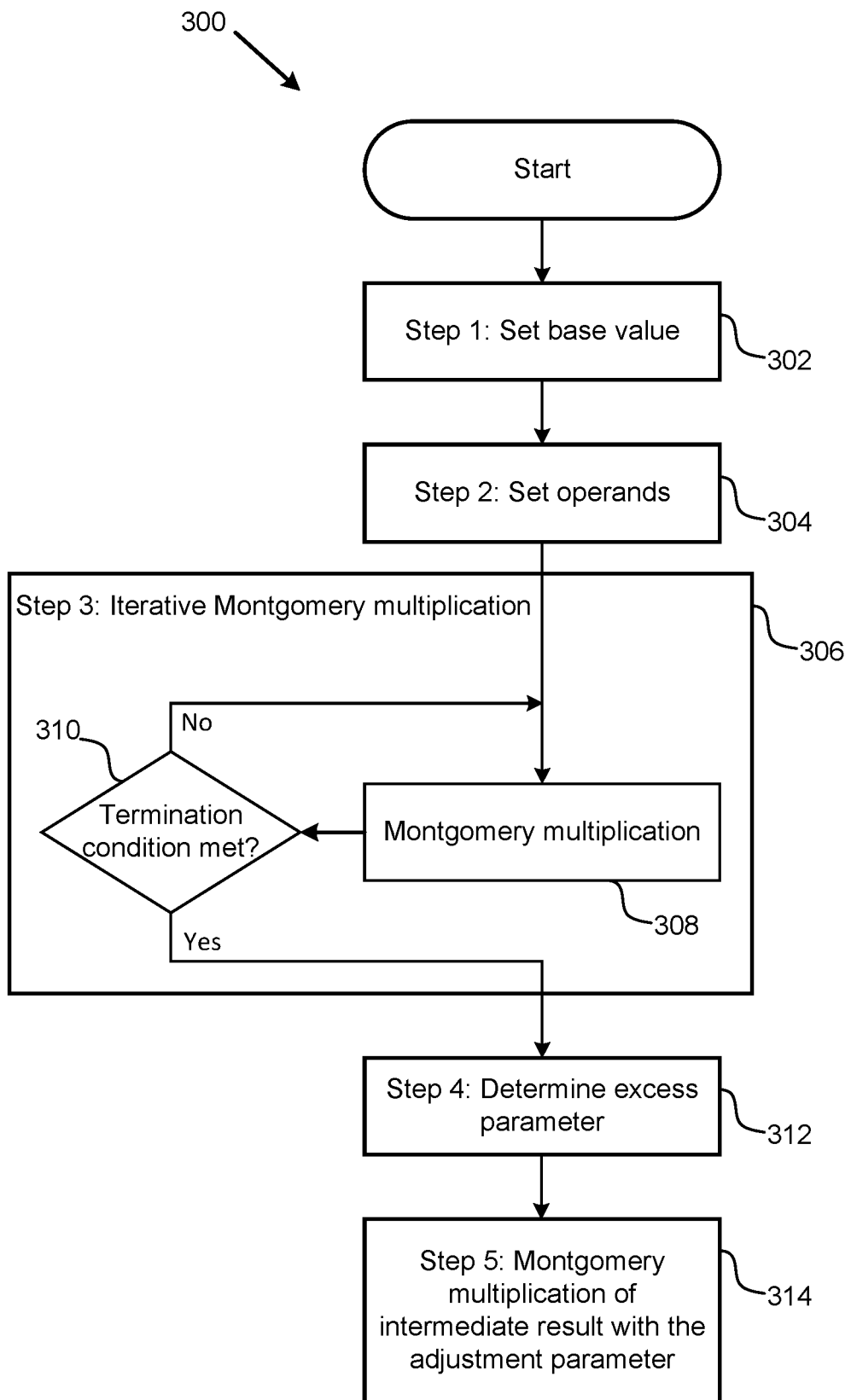
FIG. 3 is a flow chart illustrating a method to compute $R^2$ mod n, as performed by the Montgomery ALU of FIG. 2, according to an embodiment.

FIG. 3 is a flow chart illustrating steps 1 to 5 of a method 300 as performed by the Montgomery arithmetic logic unit 110, according to an embodiment, to compute $R^2$ mod n.

Steps 1 to 5 of method 300 are described mathematically, below, with reference to a first embodiment.

In step 1, 302, of method 300, the Montgomery ALU 110 determines the base value $\delta_0$ and stores the base value in Register A 216. In accordance with the first embodiment, the base value $\delta_0$ is set to 2R mod n=$2^{2^0}$ R mod n.

If R=$2^l$ is greater than n, and n is greater than $2^{l-1}$, then the base value $\delta_0$=2R mod n is equal to either 2R−2n or 2R−3n, both of which may be calculated. Since R>n, it follows that 2R−2n>0. On the other hand, since R/2<n, it follows that 2R−4n<0. Therefore, only 2R−2n or 2R−3n are candidates for 2R mod n. If n>2/3R, then 3n>2R, therefore 2R−3n<0. In this case, 2R mod n=2R−2n. On the other hand, if n<2/3R, then 3n≤2R, therefore 2R−3n≥0, and 2R mod n=2R−3n.

In step 2, 304, of method 300, the Montgomery ALU 110 sets a first and a second Montgomery multiplication operand to be equal to the base value $\delta_0$, which was determined in step 1, 302.

In step 3, 306, of method 300, the Montgomery ALU 110 iteratively performs Montgomery multiplication operations on the first and second operands to produce an intermediate multiplication result at each iteration. At the end of each iteration, the first and second operands are set to the intermediate multiplication result calculated via the Montgomery multiplication operation.

A termination condition may be defined in accordance with different embodiments of the present disclosure. In one embodiment, the termination condition is met when the intermediate multiplication result is in the form yR mod n, wherein y is greater than R. In an alternative embodiment, the termination condition is met when the intermediate multiplication result is in the form yR mod n, wherein y satisfies the form y≤R≤$y^2$.

In accordance with the first embodiment described herein, the Montgomery ALU 110 determines a first integer exponent k for which $2^{2^k}$≥R. Step 3, 306, as performed by the Montgomery ALU 110 comprises a for-loop, in which k iterations are performed. Accordingly, the termination condition for this first embodiment is a determination of whether the number of Montgomery multiplication iterations has reached k iterations.

Specifically, the Montgomery ALU 110 performs the following loop:

for (i=1, to i=k,i++); $\delta_i$=Montgomery($\delta_{i-1}$,$\delta_{i-1}$); end Once the Montgomery ALU 110 has performed the $k^{th}$ Montgomery multiplication 308, as determined by termination condition logic 310, the Montgomery ALU 110 proceeds to Step 4, 312.

It is noted that for the abovementioned loop, after iteration i, the intermediate result $\delta_i$=$2^{2^i}$R mod n. Accordingly, after iteration k, the intermediate result $\delta_k$=$2^{2^k}$R mod n. This final intermediate result, $\delta_k$, is called the penultimate result.

In step 4, 312, of method 300, the Montgomery ALU 110 determines an excess parameter, which is an amount by which the penultimate result differs from the component $R^2$ mod n. In accordance with the first embodiment, the Montgomery ALU 110 determines an integer c for which R=$2^{2^k-c}$. The Montgomery ALU 110 then determines the excess parameter to be $2^c$.

In step 5, 314, of method 300, the Montgomery ALU 110 determines an adjustment parameter, where the adjustment parameter is a function of the inverse of the excess parameter, of the form:

adjustment parameter=$2^{-c}R$ mod $n$

Then the Montgomery ALU 110 determines the component $R^2$ mod n, by performing a Montgomery multiplication of the penultimate result $\delta_k$ with the adjustment parameter, in the form:

target value=Montgomery($\delta_k$,$2^{-c}R$ mod $n$)

Calculating c

If R=$2^l$>n>$2^{l-1}$, then n>$2^{l-1}$=$2^{-1}$R, and therefore $2^{-c}$R mod n=$2^{-c}$R for any c>0. If c>0 and $2^{-c}$R>n, then the reduction $2^{-c}$R mod n is directly computed by the Montgomery ALU 110.

Alternatively, in one embodiment, the Montgomery ALU 110 calculates the reduction $2^{-c}$R mod n as an intermediate step in the computation of the reduction 2R mod n. In this case, $2^{-c}$R=$2^{l-c}$>n, therefore, the Montgomery ALU 110 determines the integer d such that $2^{l-d}$>n>$2^{l-d-1}$. The value d is greater than or equal to c, therefore 2R mod n may be calculated by noting that 2R=$2^{d+1}$R', where R'=$2^{l-d}$, and $2^{-c}$R=$2^{d-c}$R'.

Accordingly, the Montgomery ALU 110 calculates the reduction of both $2^{d+1}$R' mod n and $2^{d-c}$R' mod n by first computing 2R' mod n and then proceeding to compute 2(2R' mod n) mod n and by induction after computing $2^k$R' mod n proceeding to compute $2^{k+1}$R' mod n=2($2^k$R' mod n) mod n for all k≤d.

If d is a small integer, the full sequence of $2^k$R' mod n may be computed in low complexity. Use of an R which satisfies $2^{-d}$R>n may occur in an embodiment which uses one value of R for all the possible values of n. The value of d may be greater than zero but not much larger. The reduction $2^{-c}$R mod n may be stored in Register B 218. When the termination condition is set to y<R, an excess $2^c$ for which $2^c$R>n, so the Montgomery ALU 110 calculates $2^c$R mod n.

Signal Diagram

Figure 4:
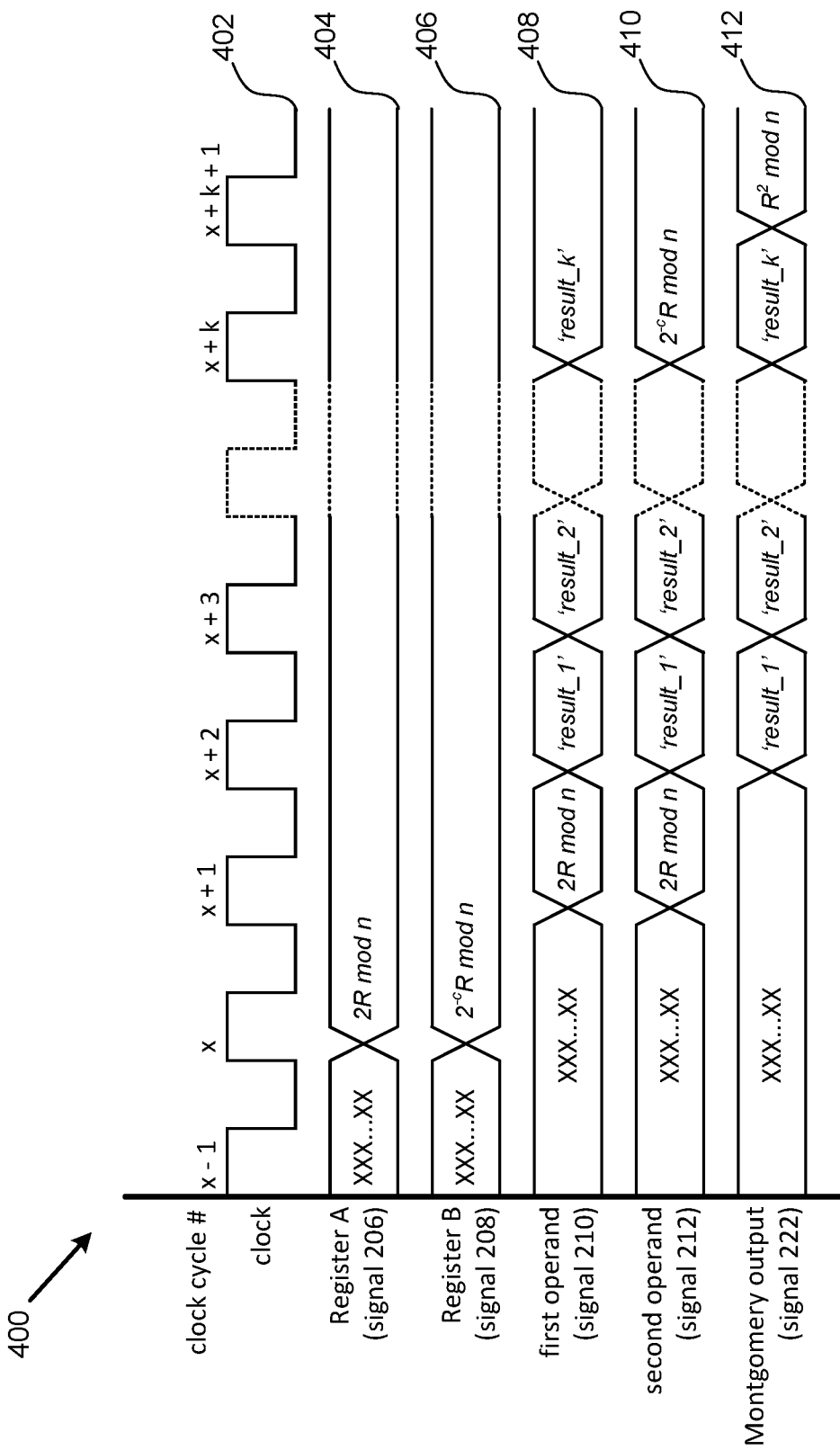
FIG. 4 is a signal diagram depicting the values of a subset of the signals of the subsection of the Montgomery ALU of FIG. 2, during the calculation of the component $R^2$ mod n, according to an embodiment.

FIG. 4 is a signal diagram depicting the values of a subset of the signals of the subsection 200 of the Montgomery ALU 110 during the calculation of the component $R^2$ mod n, for the first embodiment of the present disclosure. Signal 402 is a clock signal and, for this embodiment, the Montgomery ALU is positive-edge triggered.

The first operand is an output signal 210 of the multiplexer 204. The second operand is the other output signal 212 of the multiplexer 204. On the first clock cycle, both of the multiplexer outputs are 2R mod n. Accordingly, the first and the second operands are 2R mod n. For the following clock cycles, up to k, the multiplexer outputs are the values fed back from the Montgomery unit.

On the second clock cycle, the output 222 of the Montgomery multiplication unit 220 is equal to $2^{2^1}$R mod n. On the third clock cycle, the output 222 of the Montgomery multiplication unit 220 is equal to $2^{2^2}$R mod n. On the $k^{th}$ clock cycle, the output 222 of the Montgomery multiplication unit 220 is equal to $2^{2^k}$R mod n.

On the $k^{th}$ clock cycle, one of the multiplexer outputs 210 is the intermediate result $2^{2^k}$R mod n as fed back from the Montgomery multiplication unit on signal 222. The other multiplexer output 212 is selected as the contents of Register B 218, which is set to $2^{-c}$R mod n.

On the last clock cycle (k+1), the output 222 of the Montgomery multiplication unit 220 is the component $R^2$ mod n.

Performance

Embodiments of the present disclosure may be applied to simplify the computation of $R^2$ mod n in RSA computations through the use of Montgomery multiplication. In particular, the first embodiment, as described above, can reduce the latency of the calculation of $R^2$ mod n for RSA compared to the method of direct modulo reduction.

For small exponents e of $s^e$ mod n, which are typically used in RSA signature verification, the direct modulo reduction of $R^2$ mod n takes approximately two-thirds of the computation time for the calculation of $s^e$ mod n. In contrast, the method proposed herein takes approximately only one-third of the computation time, as exemplified by the following performance figures.

FIGS. 5A-5C are tables comprising performance figures for calculating $R^2$ mod n via the first embodiment described herein, contrasted with the performance figures for calculating $R^2$ mod n via the method of direct modulo reduction. FIGS. 5A, 5B and 5C provide performance figures for calculating $R^2$ mod n where the key size is 2048 bits, 3072 bits and 4096 bits, respectively.

Considering FIG. 5A, it can be seen that, in terms of clock cycles, the improved method saves almost 100,000 clock cycles, compared to the method of direct modulo reduction. At a clock frequency of 200 MHz, this translates to a latency saving of 494.12 microseconds.

In a hardware simulation, the clock cycle consumption for the total computation of $s^e$ mod n (i.e. the RSA core) was reduced from 240,300 cycles, in which $R^2$ mod n was calculated using direct modulo reduction, to 145,000 cycles, in which $R^2$ mod n was calculated via an embodiment of the method 300.

Further Advantages

Advantageously, the cryptographic architecture of an embodiment of the present disclosure may be more efficiently utilised because the method 300 can use the same Montgomery multiplication units which are used by the RSA multiplication. Accordingly, there may be a reduced requirement for dedicated computational units, which may not be fully utilised after the computation of $R^2$ mod n is complete. The inclusion of dedicated computation units for the calculation of a specific cryptographic value is often undesired due to increased implementation footprint, energy consumption and/or design complexity.

As noted above, although converting to the Montgomery domain consumes computation time, this computation time can be an acceptable overhead when performing many multiplications in a row, as in modular exponentiation, as intermediate results can be left in Montgomery domain representation, and the initial and final conversions may become a negligible fraction of the overall computation.

If an exponent e is large (e.g. $e>2^{16}$), then computation within the Montgomery domain is likely to be the preferred method for computing $s^e$ mod n, even for implementations that calculate $R^2$ mod n via direct modulo reduction. On the other hand, if an exponent e is smaller, it may be more efficient for an implementation to compute $s^e$ mod n directly, without converting to and from the Montgomery domain, since the calculation of $R^2$ mod n via direct modulo reduction, for conversion to the Montgomery domain, consumes a significant portion of the computation cycles for computing $s^e$ mod n. Advantageously, however, the improved method of calculating of $R^2$ mod n, as described herein, reduces the computation cycles for converting to the Montgomery domain, thus making computing $s^e$ mod n in the Montgomery domain an efficient option for a wider range of exponents.

An embodiment of the improved method 300 for $R^2$ mod n described herein may also provide an advantage in the situation where e changes over time.

In a device which uses Montgomery multipliers for calculation of cryptographic expressions other than $R^2$ mod n, embodiments of the present disclosure can utilise the existing Montgomery multipliers of the device. Accordingly, it may be worthwhile implementing embodiments of the present disclosure for even small exponents, to take advantage of the hardware optimisation provided by the method's utilisation of existing Montgomery multipliers.

Additionally, embodiments of the present disclosure may be advantageous for implementations with limited storage, particularly implementations that cannot store $R^2$ mod n for future use and have to compute it each time.

It will be appreciated by persons skilled in the art that numerous variations and/or modifications may be made to the above-described method of calculating the component $R^2$ mod n, without departing from the broad general scope of the present disclosure. Specifically, other embodiments may utilise an alternative method for determining the number of Montgomery multiplication iterations performed by the Montgomery ALU 110. Additionally, other embodiments may determine an alternative base value than the base value described above. Variations on the method 300, as described above, are disclosed in relation to a second embodiment.

Second Embodiment—Base of $2^b R$

According to a second embodiment of the present disclosure, the computation of $R^2$ mod n does not require the computation of the base value 2R mod n in all situations. Instead, in accordance with this second embodiment, the Montgomery ALU 110, in step 302, sets the base value for the first iteration to $2^b R$ for an integer $b>1$, under certain conditions, as detailed below.

In one example, the cryptographic processing unit comprises an architecture in which the memory register for storing the first and second operands of the Montgomery multiplication is $2^k$ wide, for some integer k. (For example, the memory register is 2048 bits wide, as is common for RSA implementations, and k=11.) Accordingly, $n<2^{2^k}$, and $R=2^l>n>2^{l-1}$ for some integer l. If $l=2^k$, then the cryptographic processing unit continues according to the first embodiment; however, if $l<2^k$, then following algorithm of the second embodiment may be used.

In step 1, 302, of method 300, the Montgomery ALU 110 determines the base value $\delta_0$ and stores the base value in Register A 216. In accordance with the second embodiment, the Montgomery ALU 110 determines an integer b such that $1 \leq b \leq 2^k - l - 1$.

The Montgomery ALU 110 sets the base value as $\delta = 2^b R = 2^{b+l}$. There is no need to compute mod n since $\delta = 2^b R < 2^{2^k}$ and so there are $2^k$ available bits for storing $\delta$.

Accordingly, in step 304, the first and second operands for the first iteration of Montgomery multiplication are set to $\delta_0 = 2^b R$.

In step 3, 306, of method 300, the Montgomery ALU 110 iteratively performs Montgomery multiplication operations on the first and second operands to produce an intermediate result at each iteration. At the end of each iteration, the first and second operands are set to the intermediate result calculated via the Montgomery multiplication operation.

In accordance with the second embodiment described herein, the Montgomery ALU 110 determines the first integer i for which $2^{2^i b} \geq R$ by performing the following loop:
  a. i=1;
  b. while $(2^{2^{i-1} b} < R)$
    i. $\delta$=Montgomery $(\delta, \delta)$;
    ii. i=i+1; (after iteration i, $\delta = 2^{2^i b} R$ mod n).

At the exiting of the while loop, as determined by the termination condition logic 310, the resulting δ is the penultimate result. The Montgomery ALU 110 then proceeds to Step 4, 312.

In step 4, 312, of method 300, the Montgomery ALU 110 determines an excess parameter, which is an amount by which the penultimate result differs from the component $R^2$ mod n. In accordance with the second embodiment, the Montgomery ALU 110 determines an integer c for which $R=2^{2^b-c}$. The Montgomery ALU 110 then determines the excess parameter to be $2^c$.

In step 5, 314, of method 300, the Montgomery ALU 110 determines an adjustment parameter, where the adjustment parameter is a function of the inverse of the excess parameter, of the form:

$$\text{adjustment parameter}=2^{-c}R$$

Then the Montgomery ALU 110 determines the value of component $R^2$ mod n, by performing a Montgomery multiplication of the penultimate result with the adjustment parameter, in the form:

$$\text{target value}=\text{Montgomery}(\delta, 2^{-c}R)$$

Advantageously, this second embodiment may reduce the number of Montgomery multiplications required to compute $R^2$ mod n, compared to the first embodiment, described above.

Note that for b=1, this variant coincides with the first variant. For b=2, the second embodiment saves one Montgomery multiplication compared to the first embodiment. For b=4, the second embodiment saves two Montgomery multiplications compared to the first embodiment. In general, for $b=2^j$, the second embodiment saves j+1 Montgomery multiplications compared to the first embodiment.

Third Embodiment—Two Stage Calculation of Conversion Component

According to a third embodiment, the conversion component, otherwise known as the cryptographic component, is calculated via a two-stage process. The two-stage process comprises a first stage, comprising the calculation of a base value via an iterative application of a shift and subtract operation, and a second stage comprising the calculation of the conversion component via an iterative application of Montgomery multiplication of identical operands, starting with the base value. In some cases, as detailed below, the third embodiment may further comprise determining and applying an adjustment parameter to the result of the iteratively applied Montgomery multiplications.

Advantageously, the third embodiment may reduce the processing time consumed in the computation of the conversion component $R^2$ mod n, compared to the first and second embodiments described above.

Shift and Subtract Operation

According to the third embodiment, the Montgomery ALU 110 applies an operation referred to as a shift and subtract operation. In general terms, for an integer a, the value $2^{2a}R$ mod n may be computed from $2^aR$ mod n via at least two different methods. According to a first method, a processor performs one Montgomery multiplication of two identical operands, $2^aR$ mod n, to calculate $2^{2a}R$ mod n. According to a second method, a processor performs a operations, where the first operation computes $2^{a+1}R$ mod n by multiplying $2^aR$ mod n by 2 (which may be implemented by a single bit shift to the left). If the result of shift is greater or equal to n, then the processor subtracts n to obtain $2^{a+1}R$ mod n. The processor continues the shift and subtract operation for a total of a iterations. In each iteration, the processor computes $2^{a+i+1}R$ mod n by shifting $2^{a+i}R$ mod n one bit to the left, and subtracting n if the shift resulted in a number greater than or equal to n.

Conducting the shift and subtract operation on a start value comprises calculating a shifted start value, which is equivalent to the value of the start value multiplied by two, and subtracting n if the shifted start value is greater than or equal to n. The method of calculating the shifted start value may depend on the format in which the start value is represented, including endianness, and the logical units implemented in an embodiment. According to one embodiment, calculating the shifted start value, which is equivalent to the operand $2^aR$ mod n multiplied by two, is implemented by a single bit shift of the start value to the left, wherein the most significant bit is located in the left most bit and the least significant bit is located in the right most bit. In another embodiment, in which the most significant bit is located in the right most bit, calculating the shifted start value is implemented as a single bit shift to the right.

In another embodiment, calculating the shifted start value is implemented by connecting the bits of a RegisterA containing $2^aR$ mod n to the bits of a RegisterB configured to contain $2^{a+1}R$ mod n, such that RegisterA(bit i) is connected to RegisterB(bit i+1). Alternative architectures may be implemented to determine the shifted start value, to effect the shift component of the shift and subtract operation.

Calculating the Base Value

According to the third embodiment, the Montgomery ALU 110 uses shift and subtract operations to calculate a base value $2^bR$ mod n. More particularly, the Montgomery ALU 110 computes $2^bR$ mod n, for an integer b, by performing b iterations of the shift and subtract operation, starting at start value 2R mod n.

The Montgomery ALU 110 then computes $2^{2b}R$ mod n, $2^{2^2b}R$ mod n, $2^{2^3b}R$ mod n, up to $2^{2^kb}R$ mod n via a series of k Montgomery multiplications, to obtain the conversion component $R^2$ mod n, where $R=2^{2^kb}$.

Accordingly, the Montgomery ALU 110 computes $2^{2^kb}R$ mod n with b shift and subtract operations to obtain $2^bR$ mod n, and subsequently k iterations of Montgomery multiplication of two identical operands, starting with $2^bR$ mod n, to obtain $2^{2^kb}R$ mod n.

The Values of b and k

The value of b may be set in accordance with the value of k, such that the application of b shift and subtract operations, followed by k Montgomery multiplications, produces an intermediate result which is either equal to the conversion component, or can be adjusted to be equal to the conversion component by being Montgomery multiplied with an adjustment parameter indicative of a difference between the intermediate result and the cryptographic component.

An intermediate result which can be adjusted to be equal to the conversion component $2^{2^kb}R$ mod n by being Montgomery multiplied with an adjustment parameter, is an intermediate result in the range $2^{2^{k-1}b}R$ mod n<intermediate result<$2^{2^{k+1}b}R$ mod n. Accordingly, the values of b and k are complementary, and may be configured in various arrangements to satisfy requirements or limitations of the Montgomery ALU 110, as further detailed below.

Montgomery ALU Subsection for Third Embodiment

Figure 6:
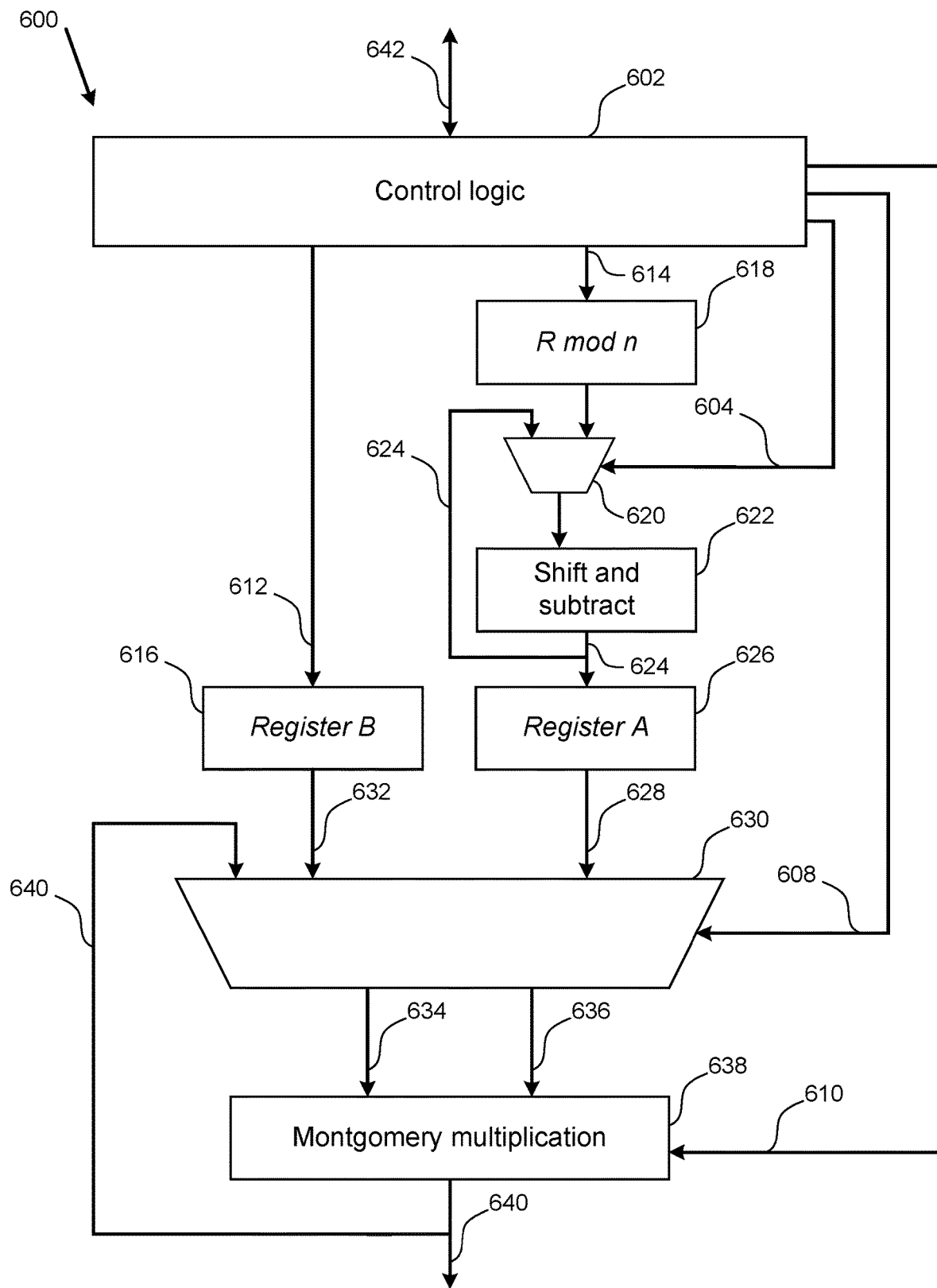
FIG. 6 is a block diagram illustrating a subsection of a Montgomery arithmetic logic unit (ALU) of FIG. 1, according to an embodiment.

FIG. 6 is a block diagram illustrating a subsection 600 of the Montgomery ALU 110. Montgomery ALU 110 can use subsection 600 to calculate the conversion component $R^2$ mod n, in accordance with the third embodiment.

Control logic block 602 provides control signals 604, 606 and 608 to control the function of other blocks within the subsection 600. Control logic block 602 also provides data values, via signals 612 and 614, to be stored in register 616 and register 618, respectively.

Control logic 602 sets register 618, and register 618 stores the value R mod n. Shift and subtract block 622 performs the two-step shift and subtract operation. This operation comprises a one bit left shift, then a conditional subtraction of n, if the left shifted value is greater than or equal to n. The result of the two-step operation performed by shift and subtract block 622 is output on data signal 624.

In accordance with the third embodiment, the shift and subtract operation is performed b times to produce an operand to be used by the Montgomery multiplier 638. The control logic 602 controls the selection signal 604 of the multiplexer 618 so that the output 624 of the shift and subtract block 622 is routed through the multiplexer 620 to the input of the shift and subtract block 622. Register A 626 is configured to store the output 624 of the shift and subtract block 622.

In one embodiment, the control logic block 602 of the Montgomery ALU 110 determines the value of b. The control logic block 602 uses the value of b to control the function of the multiplexer 620 via control signal 604. Accordingly, the input signal to the shift and subtract block 622 is initialised to R mod n from register 618, and for subsequent iterations of the shift and subtract operation, the input signal to the shift and subtract block 622 is set to the shift and subtract output signal 624.

In one embodiment, the control logic block 602 of the Montgomery ALU 110 determines the value of k. The control logic block 602 uses the value of k to control the function of the multiplexer 630 via control signal 608. Multiplexer 630 is a 3:2 multiplexer which maps three input signals, 628, 630 and 640, to two output signals, 634 and 636, in accordance with the value of the selection signal 608. The selection signal 608 is set by the control logic block 602 and indicates the mapping of one of the three input signals, 628, 630 and 640, to output signal 634. The selection signal 608 also indicates the mapping of one of the three input signals, 628, 630 and 640, to output signal 636. Input signal 628 is set by Register A 626. Input signal 632 is set by Register B 616.

Montgomery multiplication block 638 operates to perform Montgomery multiplication on a first operand and a second operand. The first operand is provided, via multiplexer 630, on data signal 634, and the second operand is provided, via multiplexer 630, on data signal 636. Functional block 638 outputs the result of Montgomery multiplication of the first operand and the second operand on output signal 640. Register B 616 stores an adjustment parameter, $2^{-c}R$ mod n, which may be Montgomery multiplied with the output of the Montgomery multiplication block 638 on signal 640.

Control logic block 602, shift and subtract logic block 622, multiplexer 620, multiplexer 630 and Montgomery multiplication unit 638 are all clocked by clock signal 120.

The Montgomery ALU 110 provides control signals and parameters to the control logic block 602 of the subsection 600, via signal 642. Parameters can comprise the values of R and n. The Montgomery ALU 110 provides the component $R^2$ mod n, as output from the Montgomery multiplication block 638 on data signal 640, to logic units within the cryptographic processing unit 102. The component $R^2$ mod n may then be used in cryptographic functions performed by the cryptographic processing unit 102.

Method for Third Embodiment

Figure 7:
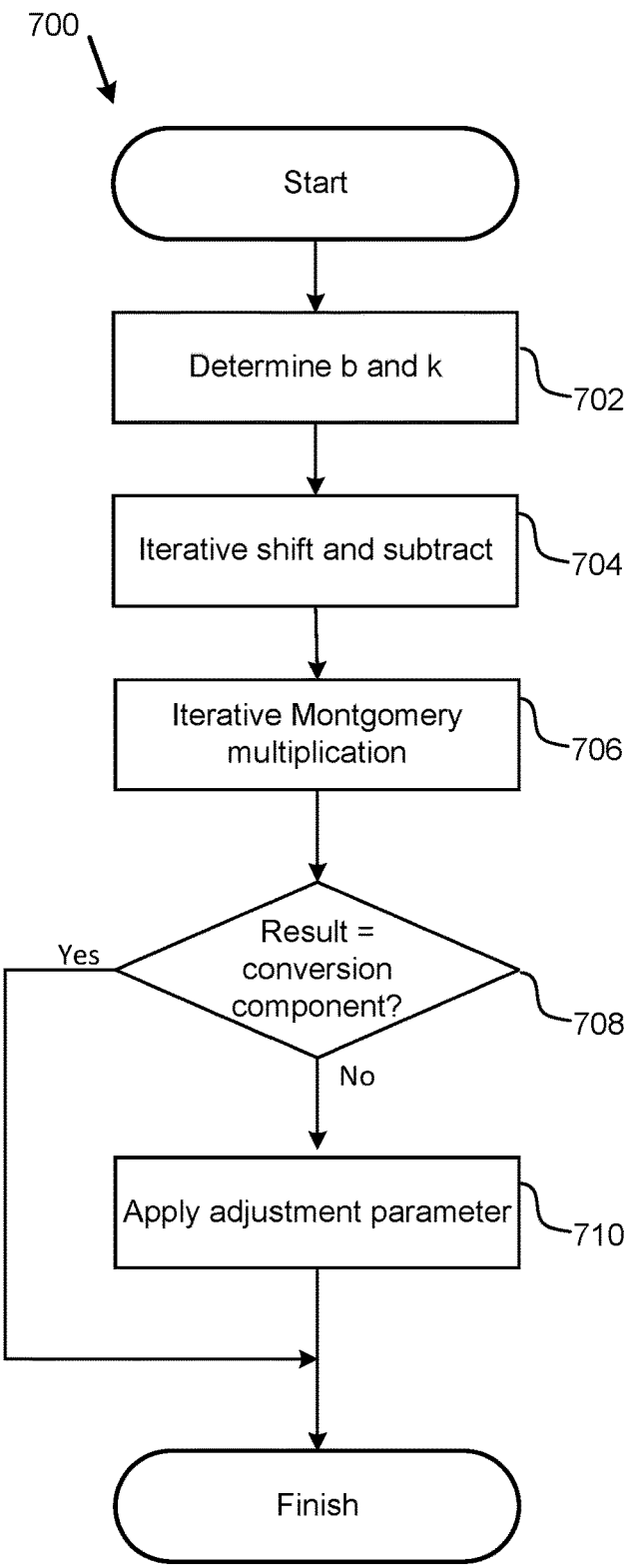
FIG. 7 is a flow chart illustrating a method to compute $R^2$ mod n, as performed by the Montgomery ALU of FIG. 6, according to an embodiment.

FIG. 7 is a flow chart illustrating the steps of a method 700 as performed by subsection 600 of the Montgomery ALU 110, according to an embodiment, to compute the conversion component $R^2$ mod n. The steps of method 700 are described below, with reference to an embodiment.

In step 702, of method 700, the Montgomery ALU 110 determines the values of b and k. In one embodiment, the Montgomery ALU 110 determines the values of b and k by accessing parameters provided by the control logic unit 104. In one embodiment, the Montgomery ALU 110 determines the values of b and k by calculating the values of b and k. Determining the values of b and k is described in further depth below.

In step 704, subsection 600 of the Montgomery ALU 110 performs b iterations of the shift and subtract operation, starting from R mod n, to calculate the base value $\delta_0 = 2^b R$ mod n. Accordingly, after step 704, the operands for the first iteration of Montgomery multiplication, as provided on signals 634 and 636, are set to $\delta_0 = 2^b R$ mod n.

In step 706, of method 700, the Montgomery ALU 110 sets a Montgomery multiplication operand to be equal to the base value $\delta_0$, which was determined in step 704.

The Montgomery ALU 110 performs k iterations of the Montgomery multiplication operation on the multiplication operand, which is provided on both signals 634 and 636. Accordingly, the multiplication operand is Montgomery multiplied with itself. An intermediate result is provided on signal 640 after each Montgomery multiplication operation. At the end of each iteration, the multiplication operand provided on signals 634 and 636 is set to the intermediate result, on signal 640, as calculated via the Montgomery multiplication operation.

After performing k iterations of the Montgomery multiplication operation, the result on signal 640 is the penultimate result.

If the values of b, k and R are in the form $R = 2^l$, where l is in the form $l = b2^k$, then the penultimate result will be equal to the conversion component $R^2$ mod n. Accordingly, in this situation there is no need to apply an adjustment parameter to the penultimate result. In decision 708, the Montgomery ALU 110 determines whether the values of b, k and R are in this form. If the values of b, k and R are in this form, the Montgomery ALU 110 does not perform step 710, and the target value, being the conversion component, is set to be the penultimate result.

In step 710, the Montgomery ALU 110 determines an excess parameter, which is an amount by which the penultimate result differs from the component $R^2$ mod n. In accordance with the second embodiment, the Montgomery ALU 110 determines an integer c for which $R = 2^{2^k b - c}$. The Montgomery ALU 110 then determines the excess parameter to be $2^c$.

Further, in step 710, the Montgomery ALU 110 determines an adjustment parameter, where the adjustment parameter is a function of the inverse of the excess parameter, of the form:

adjustment parameter $= 2^{-c} R$

Then the Montgomery ALU 110 determines the value of component $R^2$ mod n, by performing a Montgomery multiplication of the penultimate result with the adjustment parameter, in the form:

target value = Montgomery($\delta, 2^{-c} R$)

Choosing b and k

As noted above, the values of b and k are correlative, meaning that there is a relationship between the value of b and value of k. The values of b and k may be configured to satisfy requirements or limitations of the Montgomery ALU 110. More specifically, the value of b may be set in conjunction with setting the value of k, such that the application of b shift and subtract operations, followed by k Montgomery multiplications produces an intermediate result which is either equal to the conversion component, or can be adjusted to be equal to the conversion component by being Montgomery multiplied with an adjustment parameter. An intermediate result which can be adjusted to be equal to the conversion component $2^{2^k b}R$ mod n by being Montgomery multiplied with an adjustment parameter, is an intermediate result in the range $2^{2^{k-1}}R$ mod n<intermediate result<$2^{2^{k+1} b}R$ mod n.

In other words, the values of b and k may be selected by noting that, for each choice of b, the required number of operations to obtain $2^{2^k b}R$ mod n is b shift and subtract operations, and k Montgomery multiplications up to the point where $2^{2^k b}$ is in the range $R/2 < 2^{2^k b} < 2R$.

A Montgomery ALU may be configured with static values of either or both of b and k. Alternatively, control logic block 104 may dynamically configure a Montgomery ALU with values of b and k, or may dynamically set the values of b and k for a calculation of the conversion component. The values of b and k may be adjusted for the calculation of different conversion components. For example, the value of b may be adjusted upwards to increase the number of shift and subtract operations performed by the Montgomery ALU, and to decrease the number of Montgomery multiplications performed by the Montgomery ALU. Conversely, the value of b may be adjusted downwards to decrease the number of shift and subtract operations performed by the Montgomery ALU, and to increase the number of Montgomery multiplications performed by the Montgomery ALU.

Accordingly an embodiment of the Montgomery ALU may be configured to set the values of b and k, or may be configured to calculate preferred values of b and k according to the requirements of the cryptographic processing unit 102. Accordingly, the values of b and k may be hardcoded, dynamically selected, or dynamically calculated.

The selection of preferred values of b and k may depend on the architecture of the subsection 600 of the Montgomery ALU 110. Alternatively or additionally, the selection of the values of b and k may depend on the operational cost of performing the shift and subtract operation, and the operational cost of performing the Montgomery multiplication function, where operational cost may comprise the processing time consumed per operation, the number of clock cycles consumed per operation, or the power consumed per operation.

In one embodiment, the Montgomery ALU 110 chooses the value of b as the first integer for which the Montgomery multiplication operation consumes less processing time than b iterations of the shift and subtract operation. Processing time may be measured in clock cycles, machine cycles, or units of time.

In another embodiment, the Montgomery ALU 110 sets values b and k to avoid the need to apply an adjustment parameter in step 710. More particularly, R is in the form $R=2^l$, where l is in the form $l=b2^k l$, where b is an odd integer. Using this factorization, the Montgomery ALU 110 calculates the conversion component $R^2$ mod n by b shift and subtract operations and k Montgomery multiplications, with no need to apply an adjustment parameter based on the excess parameter $2^c$, in step 710.

For example, considering the situation in which $R=2^{2048}=2^{2^{11}}$, if the Montgomery ALU 110 selects b=10, the Montgomery ALU will perform 10 shift and subtract operations and 8 Montgomery multiplications to obtain $2^{10 \cdot 2^8}R$ mod n, where $2^{10 \cdot 2^8}=2^{2560}>>2^{2048}$. Accordingly, the intermediate result exceeds the value of the conversion component. As a result, the Montgomery ALU 100 will adjust the intermediate result downwards, by Montgomery multiplying the intermediate result with the adjustment parameter to obtain the conversion component. Alternatively, if the Montgomery ALU 11 selects b=8, the Montgomery ALU 110 will calculate exactly $2^{2048}R$ mod n in just 8 shift and subtract operations and 8 Montgomery multiplications, with no need to apply an adjustment parameter.

According to another embodiment, the values of b and k may be determined empirically by calculating, for different values of b, the minimal value k, such that $b \cdot 2^k \geq 2^l$. For each value of b, the Montgomery ALU 110 calculates the operational cost of computing b shift and subtract operations followed by k Montgomery multiplications and a further Montgomery multiplication to apply the adjustment parameter to reduce the intermediate result to the value of the conversion component. Accordingly, a value of b may be chosen to minimize the cost (in terms of processing time, power consumption, clock cycles or machine cycles) of b shift and subtract operations and k+1 Montgomery multiplications. In one embodiment, the Montgomery ALU sets the value of b based on a calculation of the processing time and/or power that would be consumed in the calculation of the conversion component for that value of b.

According to another embodiment, the Montgomery ALU 110 calculates the maximal value k, such that $b \cdot 2^k \leq 2^l$ for many values of b. The Montgomery ALU 110 calculates $R^2$ mod n for each value of b by b shift and subtract operations and k Montgomery multiplications, which provides a value of $2^{b \cdot 2^k}R$ mod n, followed by a further Montgomery multiplication of the intermediate result with an adjustment parameter to increase the intermediate result to the value of the conversion component.

Performance

FIGS. 8A-8B are tables comprising performance figures for calculating $R^2$ mod n, according to the third embodiment, where the key size is 2048 bits, 3072 bits and 4096 bits. FIGS. 8A and 8B provide performance figures for calculating $R^2$ mod n where the value of b is 16 and 1024, respectively.

Considering FIG. 8A, it can be seen that, for a key size of 2048 bits and for b=16, the method of the third embodiment consumes 36,754 clock cycles compared to 52,728 clock cycles consumed by calculating the conversion component via the first embodiment (referring to FIG. 5A). At a clock frequency of 200 MHz, this translates to a latency improvement of 79.87 microseconds.

Considering also FIG. 8B, it can be seen that, for a key size of 2048 bits, the application of the method of the third embodiment with b=1024, increases the number of clock cycles consumed to calculate the conversion component from 36,754 to 107,257 compared to the method of the third embodiment with b=16. At a clock frequency of 200 MHz, this translates to a latency increase of 352.52 microseconds.

Furthermore, the number of clock cycles consumed (107,257) to calculate the conversion component for key size of 2048 bits, via the method of the third embodiment with b=1024 is higher than the number of clock cycles consumed (52,728) to calculate the conversion component for key size 2048 bits via the method of the first embodiment (referring to FIG. 5A). Accordingly, it can be seen that a non-optimal value of b can increase the latency for calculating the conversion component.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

It will be appreciated by persons skilled in the art that the present invention is not limited to what has been particularly shown and described herein. Rather, the scope of the present invention is defined only by the claims that follow.

The invention claimed is:

1. A method for calculating a cryptographic component $R^2$ mod n for a cryptographic function, where n is a modulo number and R is a constant greater than n, the method comprising:
   iteratively performing Montgomery multiplication of a first operand with a second operand to produce an intermediate result, wherein the first operand and the second operand are set to the intermediate result after each iteration;
   responsive to a termination condition being met, determining an adjustment parameter indicative of a difference between the intermediate result and the cryptographic component; and
   performing Montgomery multiplication of the intermediate result with the adjustment parameter, to calculate the cryptographic component for the cryptographic function.

2. The method of claim 1, wherein:
   the cryptographic component is an integer equal to $R^2$ mod n;
   R is of the form $2^l$;
   l is an integer;
   n is an integer which is less than R; and
   R is coprime with n.

3. The method of claim 1, wherein the intermediate result, when the termination condition is met, exceeds the cryptographic component.

4. The method of claim 1, wherein determining the adjustment parameter comprises determining an excess parameter, the excess parameter being indicative of a difference between the intermediate result and the cryptographic component.

5. The method of claim 4, wherein the adjustment parameter is a function of an inverse of the excess parameter.

6. The method of claim 4, wherein determining the excess parameter comprises:
   determining an integer c for which $2^{2^k-c}$ is equal to R; and
   setting the excess parameter to be equal to $2^c$.

7. The method of claim 4, wherein the adjustment parameter is equal to the inverse of the excess parameter multiplied by R mod n.

8. The method of claim 4, wherein determining the excess parameter comprises:
   determining an integer c for which $2^{2^{ib}-c}$ is equal to R; and
   setting the excess parameter to be equal to $2^c$.

9. The method of claim 4, wherein the adjustment parameter is equal to the inverse of the excess parameter multiplied by R.

10. The method of claim 1, further comprising determining a base value.

11. The method of claim 10, wherein the base value is equal to 2R mod n.

12. The method of claim 10, wherein:
    the base value is equal to $2^b R$;
    b is an integer greater than or equal to 1;
    b is less than $(2^k-1)$; and
    k is a first integer for which $2^{2^k}$ is greater than or equal to R.

13. The method of claim 10, further comprising:
    determining an integer b, where b is greater than or equal to 1, and b is less than $(2^k-1)$;
    responsive to b being equal to 1, setting the base value to an integer equal to 2R mod n; and
    responsive to b exceeding 1, setting the base value to an integer equal to $2^b R$.

14. The method of claim 1, wherein:
    the termination condition is met when the intermediate result is in the form yR mod n; and
    y exceeds R.

15. The method of claim 1, wherein:
    the termination condition is the completion of k Montgomery multiplication iterations; and
    k is a first integer for which $2^{2^k}$ is greater than or equal to R.

16. The method of claim 1, wherein:
    the termination condition is the completion of i Montgomery multiplication iterations; and
    i is a first integer for which $2^{2^{ib}}$ is greater than or equal to R.

17. The method of claim 16, further comprising:
    responsive to b being equal to 1, setting the termination condition to be the completion of k Montgomery multiplication iterations, where k is a first integer for which $2^{2^k}$ is greater than or equal to R; and
    responsive to b exceeding 1, setting the termination condition to be the completion of i Montgomery multiplication iterations, where i is a first integer for which $2^{2^{ib}}$ is greater than or equal to R.

18. An apparatus for calculating a cryptographic component $R^2$ mod n for a cryptographic function, where n is a modulo number and R is a constant greater than n, the apparatus comprising an arithmetic logic unit configured to:
    iteratively perform Montgomery multiplication of a first operand with a second operand to produce an intermediate result, wherein the first operand and the second operand are set to the intermediate result after each iteration;
    responsive to a termination condition being met, determine an adjustment parameter indicative of a difference between the intermediate result and the cryptographic component; and
    perform Montgomery multiplication of the intermediate result with the adjustment parameter, to calculate the cryptographic component for the cryptographic function.

19. The apparatus of claim 18, wherein the arithmetic logic unit comprises:
    a Montgomery multiplication unit having a first and a second input for receiving a first and a second operand, respectively, and having an output for supplying an intermediate result, the Montgomery multiplication unit configured to perform a Montgomery multiplication function on the first and the second operands to produce the intermediate result; and
    a controller for controlling the values of the first input and the second input, the controller configured to perform the steps of, iteratively setting the first and the second input to the intermediate multiplication result, until a termination condition is met; and responsive to the termination condition being met, setting the first input to the intermediate result and setting the second input to an adjustment parameter.

20. An apparatus for calculating a cryptographic component $R^2$ mod n for a cryptographic function, where n is a modulo number and R is a constant greater than n, the apparatus comprising:

means for iteratively performing Montgomery multiplication of a first operand with a second operand to produce an intermediate result, wherein the first operand and the second operand are set to the intermediate result after each iteration;

means for determining, responsive to a termination condition being met, an adjustment parameter indicative of a difference between the intermediate result and the cryptographic component; and means for performing Montgomery multiplication of the intermediate result with the adjustment parameter, to calculate the cryptographic component for the cryptographic function.

* * * * *